United States Patent [19]
Habermann et al.

[11] Patent Number: 5,111,697
[45] Date of Patent: May 12, 1992

[54] LARGE-AMPLITUDE LOW-FREQUENCY VIBRATOR

[75] Inventors: Helmut Habermann, Vernon; Jean Jolivet, Gasny, both of France

[73] Assignee: Societe de Mecanique Magnetique S.A., Saint-Marcel, France

[21] Appl. No.: 654,304

[22] Filed: Feb. 12, 1991

[30] Foreign Application Priority Data

May 18, 1990 [FR] France .................. 90 06274

[51] Int. Cl.$^5$ .................. G01N 29/00; H02K 7/09
[52] U.S. Cl. .................. 73/668; 310/51
[58] Field of Search .......... 73/662, 668, 664, 578; 310/15, 51, 90.5; 318/114

[56] References Cited

U.S. PATENT DOCUMENTS

| 4,675,563 | 6/1987 | Goldowsky ............ 310/15 |
| 4,947,067 | 8/1990 | Habermann et al. ...... 73/668 |

FOREIGN PATENT DOCUMENTS

| 0033803 | 2/1982 | European Pat. Off. . |
| 2213447 | 10/1973 | Fed. Rep. of Germany . |
| 1057180 | 4/1955 | France . |
| 1450818 | 7/1966 | France . |
| 2133583 | 11/1972 | France . |
| 0057576 | 5/1977 | Japan ............ 73/668 |

OTHER PUBLICATIONS

Patent Abstract of Japan, vol. 7, No. 165 (M-230), Jul. 20, 1983 and JP-A-58-071 003 (Daini Seikosha), Apr. 27, 1983.

*Primary Examiner*—Hezron E. Williams
*Assistant Examiner*—Louis M. Arana
*Attorney, Agent, or Firm*—Weingarten, Schurgin, Gagnebin & Hayes

[57] ABSTRACT

A vibrator acting in a low frequency vibration domain, for fixing to and applying low frequency vibrations on a frame in a first predetermined direction along an axis X'X. The vibrator comprises: a first structure having cylindrical pole pieces cylindrical about an axis coaxial to said predetermined direction X'X and provided at their peripheries with coils, and at least one means for creating a magnetic field for causing a magnetic flux to be established between the cylindrical pole pieces; a second structure comprising a cylindrical ferromagnetic mass coaxial about the axis X'X and having cylindrical pole pieces whose peripheries are situated facing respective ones of the coils, and enabling magnetic flux to be established through the ferromagnetic mass; radial active magnetic bearings for holding the second structure radially relative to the first structure without making contact therewith; at least one detector for detecting vibrations along the axis X'X; and circuits for servo-controlling the current flowing in the coils as a function of signals delivered at least by the detector.

19 Claims, 5 Drawing Sheets fig. 2

LARGE-AMPLITUDE LOW-FREQUENCY VIBRATOR

The present invention relates to a large-amplitude low-frequency vibrator acting on low-frequency vibrations of a frame along a predetermined direction X'X.

BACKGROUND OF THE INVENTION

It is often necessary to damp low-frequency vibrations, e.g. vibrations having a frequency lying between a few hertz and a few tens of hertz, and appearing in structures along a predetermined direction, exerting non-negligible stresses thereon. In contrast, in certain cases, it is desirable to be able to create large-amplitude low-frequency vibrations in a structure along a given direction, with such vibrations being used for various purposes, e.g. sorting or cleaning, in addition to simulating or compensating vibratory phenomena.

Various types of unidirectional vibrators capable of generating or damping vibrations at a predetermined frequency already exist. However, these actuators often have a moving member of small mass or having limited displacement possibilities, e.g. about 1 millimeter, thus making it impossible to create forces that are large enough for generating or damping vibrations at a low frequency of around a few hertz.

Thus, vibrating pots are known which generate relatively high-frequency vibrations and which include an outlet fixed to a small cantilevered moving mass and provided with a small coil disposed in the air gap of a permanent magnet which is itself connected to a frame by means of springs. Such an actuator having a small moving mass is suitable only for use at frequencies of at least several hundreds of hertz and it also suffers from drawbacks insofar as the suspension and moving mass assembly is not very rigid, thus making the device highly sensitive to lateral shocks.

More generally, prior vibrating pots constitute relative vibrators which create forces between a stator and an outlet, in contrast to an absolute vibrator which has a free mass with the reaction forces on the stator or the frame of an absolute vibrator being used to create the required forces. Vibrating pot type relative vibrators remain fragile and difficult to use.

One example of a known free mass absolute vibrator is constituted by an omnidirectional vibrator having a spherical free body mounted by means of electromagnets inside a housing which is thus capable of creating forces in three different directions. However, such a vibrator is a high-frequency device and must have small air gaps, which means it cannot accommodate displacements exceeding about 1 millimeter.

The present invention seeks to remedy the above-mentioned drawbacks and to provide a vibrator device constituting a large-amplitude actuator capable of acting on structures in a given direction over a range of low frequencies, exerting large forces without being sensitive to lateral shocks.

SUMMARY OF THE INVENTION

These aims are achieved by a low-frequency vibrator acting on low-frequency vibrations of a frame in a predetermined direction X'X, the vibrator comprising:

a) a first structure comprising first and second cylindrical pole pieces which are cylindrical about an axis extending along said direction X'X and which are provided at their peripheries with respective first and second coils, and at least one means for creating a magnetic field, said means being disposed between said first and second cylindrical pole pieces to cause magnetic flux to be established therebetween;

b) a second structure essentially comprising a cylindrical ferromagnetic mass coaxial about said axis and having third and fourth cylindrical pole pieces whose peripheries are situated facing said first and second coils respectively, enabling said magnetic flux to be established through said ferromagnetic mass;

c) first and second radial active magnetic bearings disposed on either side of the assembly constituted by said first and second pole pieces for holding the second structure radially relative to the first structure without making contact therewith;

d) at least one detector for detecting vibrations along said axis, and disposed on one of said first and second structures; and e) servo-control circuits for controlling the current flowing through the coils as a function of signals delivered at least by said detector.

In a first possible embodiment, the first structure is fixed to a frame while the second structure is flexibly mounted relative to the first structure.

In a second possible embodiment, the first structure is flexibly mounted relative to the second structure which is itself fixed to a frame.

The first structure may be disposed coaxially inside the second structure, but the opposite disposition with a second structure disposed coaxially inside the first structure is also possible.

The vibration detector or a plurality of vibration detectors may be mounted on a stationary structure fixed to the frame.

In a particular embodiment, the means for creating a magnetic field comprise a permanent magnet connected to the first and second cylindrical pole pieces by magnetic flux concentrating circuits.

In another particular embodiment, the means for creating a magnetic field are constituted by at least one electromagnet comprising a coil and a yoke fixed to said first and second cylindrical pole pieces.

Advantageously, the vibrator further comprises a position detector for detecting the axial positions of the coils of the first structure relative to said corresponding third and fourth cylindrical pole pieces of the second structure, and an additional servo-control loop for controlling the current flowing through the coils as a function of the signals from said position detector.

The circuits for servo-controlling the current flowing in the first and second coils may be configured in such a manner that the vibrator operates as a vibration damper.

The vibrator of the invention constitutes an absolute vibrator having a free mass, with the required forces being created from reaction forces generated on the stationary structure fixed to the frame. The amplitude of the displacements of the free mass along the predetermined direction may be considerable without there being a significant increase in the energy required, and this amplitude depends solely on the dimensions, in this direction, of the third and fourth cylindrical pole pieces of the second structure relative to the dimensions in the same predetermined direction of the first and second windings of the first structure.

BRIEF DESCRIPTION OF THE DRAWINGS

Embodiments of the invention are described by way of example with reference to the accompanying drawings, in which.

DETAILED DESCRIPTION

A first embodiment of a vibrator device of the invention is described initially with reference to FIGS. 1 to 5. This device is designed to exert action along an axis X'X which may be horizontal, for example.

Figure 1:
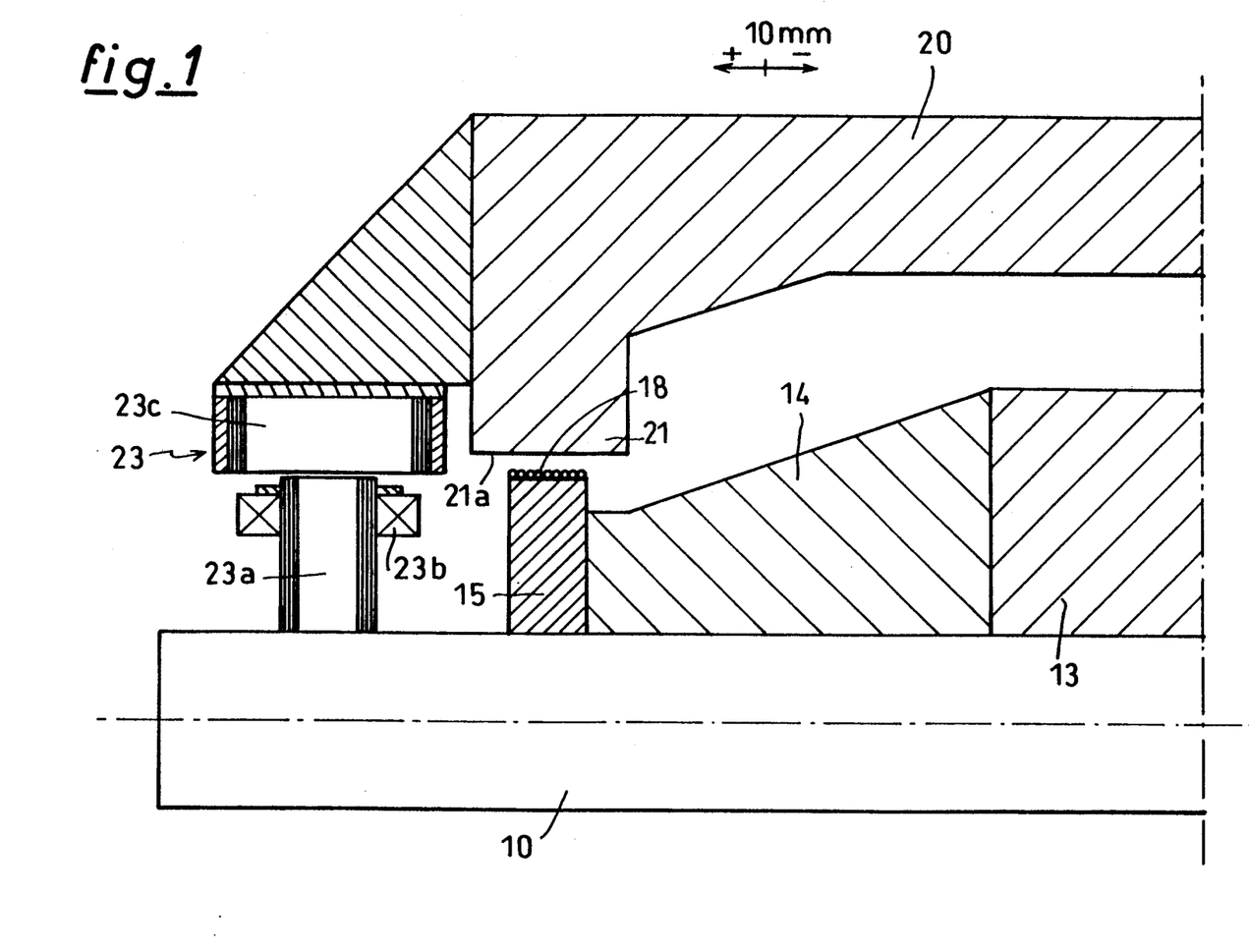
FIG. 1 is a diagrammatic axial section through one fourth of a first embodiment of a vibrator device implementing a permanent magnet.
Figure 2:
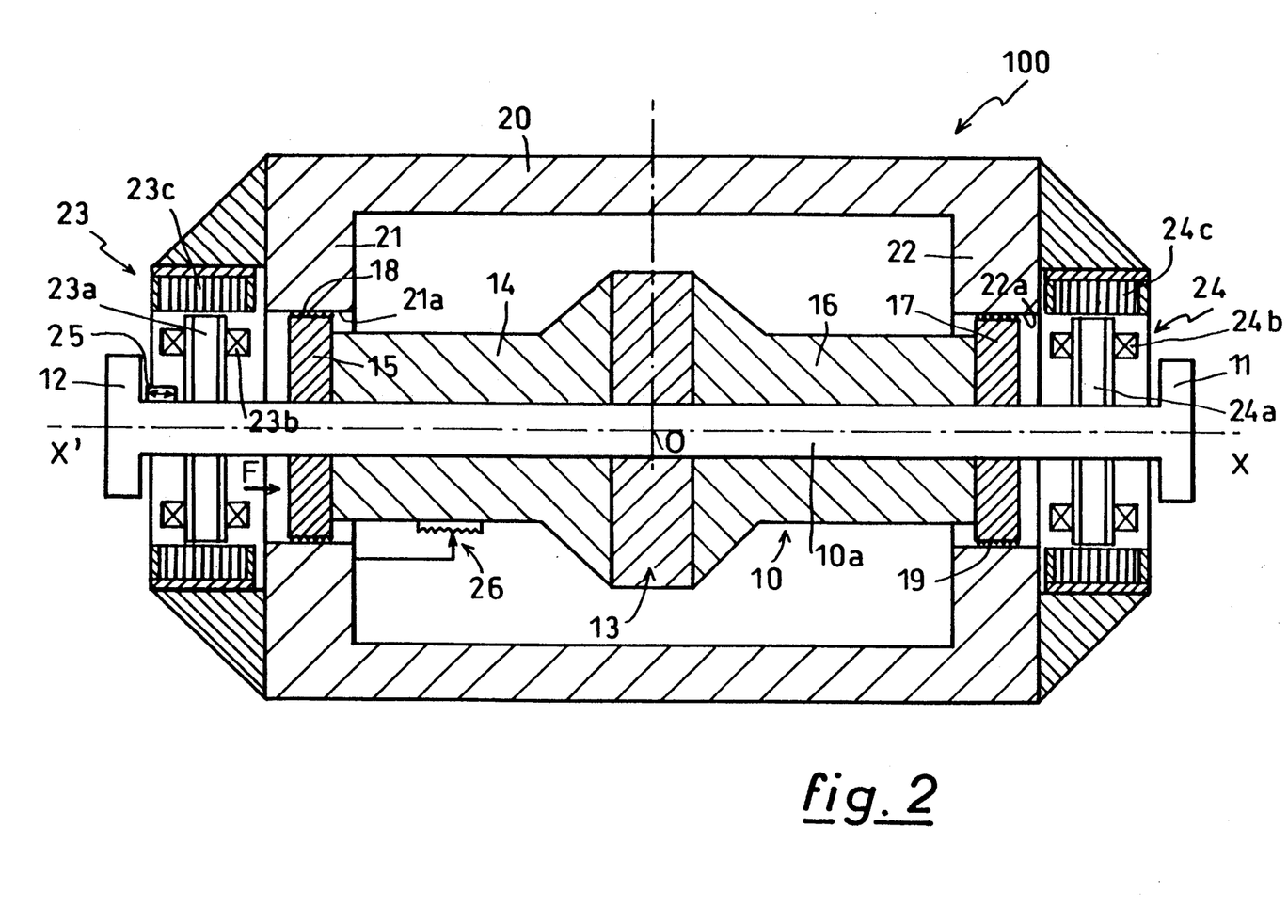
FIG. 2 is a view analogous to FIG. 1 showing the first embodiment of a vibrator device in full.

The vibrator device 100 shown in FIGS. 1 and 2 essentially comprises a central first structure 10 which comprises a shaft 10a provided with end flanges 11 and 12 enabling the central structure 10 to be fixed to an external frame for which vibrations in the direction X'X are to be damped, created, or compensated. The central portion of the shaft 10a carries a cylindrical permanent magnet 13, e.g. of the samarium-cobalt type, with bodies of revolution 14 and 16 being disposed on either side thereof to act as magnetic flux concentrators. The ends of the bodies 14 and 16 distant from the permanent magnet 13 are themselves in contact with respective cylindrical pole pieces 15 and 17 which are coaxial about the axis X'X and provided with respective coils 18 and 19 about their peripheries. A second structure 20, coaxial with the first structure 10, constitutes a free mass held thereabout by means of two active radial magnetic bearings 23 and 24. Each of the radial magnetic bearings 23 and 24 comprises a respective stator yoke 23a, 24a mounted on the central shaft 10a and provided with respective electromagnetic coils 23b and 24b, and respective cylindrical rotor pole pieces 23c and 24c mounted on the floating structure 20 so as to provide respective air gaps around the cylindrical peripheral portion of the corresponding stator yokes 23a and 24a, with said gaps being a few tenths of a millimeter across, for example. The radial magnetic bearings 23 and 24 are servo-controlled on the basis of radial detectors which may be disposed in the immediately proximity of said bearings 23 or 24, or else in the same radial planes as the bearings 23 and 24.

The outer structure 20 flexibly mounted around the inner structure 10 by means of the radial magnetic bearings 23 and 24 is unusual in that it includes a cylindrical ferromagnetic circuit coaxial with the inner structure 10, which circuit has cylindrical pole pieces 21 and 22 whose inner peripheries 21a and 22a are situated facing respective ones of the coils 18 and 19 while leaving respective air gaps relative to the outer peripheries of the cylindrical pole pieces 15 and 17 which form a portion of the inner structure 10.

Figures 3, 4, 5:
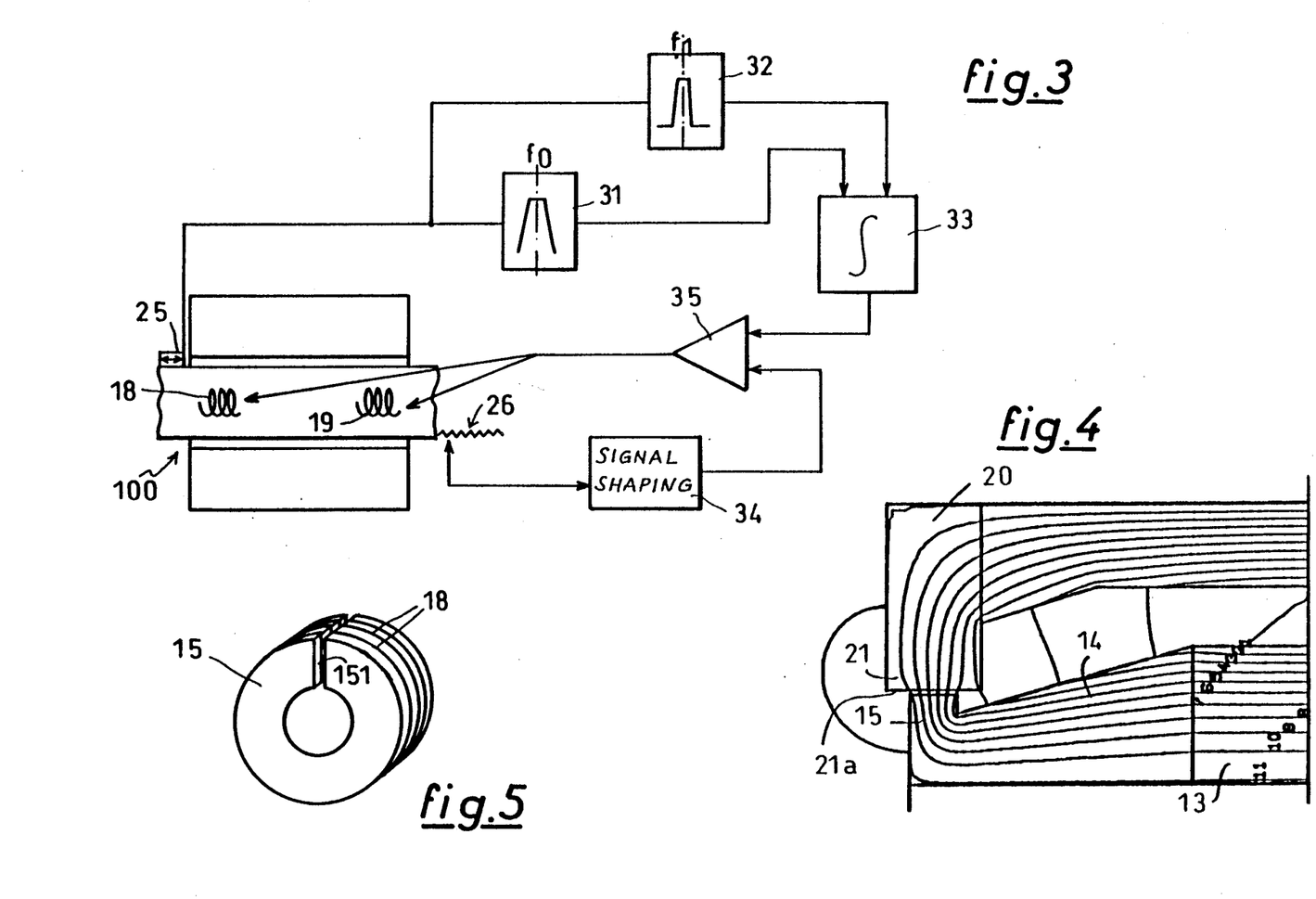
FIG. 3 is a block diagram of the servo-control circuits associated with the vibrator device of FIGS. 1 and 2.
FIG. 4 is a detail view of the FIG. 1 embodiment showing lines of magnetic flux.
FIG. 5 is a perspective view of an example of a split cylindrical pole piece provided with a winding and suitable for use in the vibrator device of the invention.

As shown in FIG. 4, the lines of magnetic flux created by the central permanent magnet 13 pass along the flux concentrators 14 and 16 to the cylindrical pole pieces 15 and 17 provided with the coils 18 and 19, and are then looped through the ferromagnetic circuit of the floating outer structure 20, passing through the air gaps between the pairs of pole pieces 15 and 21 and 17 and 22.

The central structure 10 and the floating outer structure 20 are thus interconnected without making contact, firstly by means of the radial magnetic bearings 23 and 24 which hold the outer structure 20 in place in the radial direction (perpendicularly to the axis X'X) relative to the inner structure 10, and secondly by means of a linear electromagnetic motor constituted by the items referenced 13 to 22, thereby making it possible for the outer structure 20 to be displaced axially relative to the inner structure 10 through a relatively large amplitude, e.g. about ±10 mm.

The cylindrical pole pieces 15 and 17 which are made of steel, for example, preferably have respective slots 151 occupying at least one axial half-plane (FIG. 5) in order to limit eddy currents. The flux concentrators 14 and 16 may be made of mild steel, for example.

By way of example, the cylindrical pole pieces 15 and 17 may each have a diameter D of about 0.1 meters (m). The air gaps e between the pole pieces 15 and 17 of the structure 10 and the pole pieces 21 and 22 of the structure 20 may be between 0.001 m and 0.003 m across, for example.

The axial length of each of the first and second cylindrical pole pieces 15 and 17 carrying the coils 18 and 19 on the structure 10 may lie between about 10 mm and about 30 mm, whereas the axial length of each of the third and fourth cylindrical pole pieces 21 and 22 of the structure 20 may lie between about 30 mm and about 60 mm. Naturally, the cylindrical pole pieces 21 and 22 are always greater in length than the cylindrical pole pieces 15 and 17 by an amount equal to the maximum allowable axial displacement of the structure 20 (e.g. by 20 mm if the axial displacement capability of the vibrator, i.e. its vibration amplitude a, is ±10 mm).

A position sensor 26 (FIG. 2) detects displacements of the structures 10 and 20 relative to each other in order to keep the pole pieces 15 and 21 and 17 and 22 facing each other in pairs. One or more accelerometers 25 are disposed on the structure 10 or on the frame to which the structure is fixed to act as sensors for the servo-control circuits that apply electricity to the coils 18 and 19 of the linear motor.

The servo-control circuits controlling the coils 18 and 19 are shown in the form of a block diagram in FIG. 3.

The signals from the vibration detector(s) 25 are applied in parallel to bandpass filters 31 and 32 centered respectively on a fundamental frequency f0, e.g. about 5 Hz, and on a frequency f1 which is a harmonic of the fundamental frequency f0 (e.g. f1=10 Hz). The signals delivered by the bandpass filters 31 and 32 which correspond to the vibration frequencies to be taken into account, e.g. for damping purposes, are applied via integrator and shaping circuits 33 to an amplifier 35, e.g. of the four quadrant type, with the output from the amplifier feeding the coils 18 and 19. An additional servo-control loop includes a signal shaping circuit 34 to which the signals from the detector 26 are applied and having an output which is connected to a second input of the amplifier 35.

In FIG. 3, the circuits for servo-controlling the radial magnetic bearings 23 and 24 are not shown since they are conventional and independent from the circuits for servo-controlling the linear motor for the purpose of producing axial displacements.

By way of example, the pole pieces 15 and 17 carrying the coils 18 and 19 may have a diameter D=0.1 m and an axial length b=0.02 m, thereby co-operating with the pole pieces 21 and 22 of the flexibly-mounted structure to define air gaps of radial extent e=0.002 m. The permanent magnet 13 may be selected to establish a magnetic field B of 1 tesla between the pairs of pole pieces 15 and 21 and 17 and 22.

For a vibration frequency f=5 Hz and a flexibly-mounted structure having a mass m=100 kg, a force F=1000 newtons may be applied by the vibrator 100 with the amplitude of the axial displacement of the flexibly-mounted structure a being 0.01 m, as given by the equation:

$$a = F/((2\pi f)^2 \cdot m) = 0.01 \ m$$

Because the flexibly-mounted structure 20 is capable of substantial axial displacement a, it is possible to use the vibrator 100 at low frequencies and with a flexibly-mounted structure whose mass may lie between about 50 kg and 100 kg to exert or compensate considerable forces of about 1000 newtons, which is not possible using prior art vibrating pots that are cantilever mounted, and which is not possible using axial magnetic bearings having small air gaps.

The magnetizing current I required by the coils 18 and 19 is:

$$I = F/(D \cdot \pi \cdot B)$$

giving I=3183 A with the numerical values given above for the force F exerted by the vibrator, the diameter D of the pole pieces 15 and 17, and the value B of the magnetic field at the coils 18 and 19.

The Joule effect losses in the coils 18 and 19 can be estimated under such circumstances as being equal to:

$$N = R \cdot I^2$$

where R represents the resistance of the coils 18 and 19.

For coils 18 and 19 having a thickness $e_b$=0.001 m, a coefficient k=1.25 for taking account of the insulation on the copper, and a value of $1.7 \times 10^{-8}$ ohm/m for the resistivity $\sigma$ of copper, the resistance of the coils 18 and 19 may be evaluated as follows:

$$R = k \cdot \sigma \cdot D \cdot \pi / (2 \cdot b)$$

giving R=$5.3 \times 10^{-5}$ ohms with the numerical values given above for k, $\sigma$, D, and b.

The losses N can be evaluated under these conditions as being 538 watts.

With a sinusoidal force having an amplitude of 1000 newtons, the losses ard 269 watts, which does not give rise to excessive heating. However, it is also possible to implement a system for cooling the coils 18 and 19, e.g. by means of compressed air.

Vibrators 100 of the invention may be used in pairs having their stationary portions 10 mounted on each side of a frame to be stabilized or excited, thereby avoiding the creation of interfering torques.

When one or more vibration sensors 25 such as accelerometers or velocity meters are disposed at various points on the frame to be stabilized to which the structures 10 of one or more vibrators 100 of the invention are fixed, it is possible to use an influence matrix to optimize the loops servo-controlling the current flowing in the coils 18 and 19 of the vibrators as a function of vibration sensors 25 responsive to narrow frequency bands centered on the vibration fundamental frequency fO and on its harmonics fl.

Under some circumstances, the embodiment shown in FIGS. 1 to 5 which makes use of a permanent magnet to create the magnetic field in which the coils 18 and 19 of the linear motor are placed may have insufficient mechanical strength given the requirement of assembling permanent magnets 13 with the ferromagnetic parts 14, 15, 16, and 17 of the stationary central structure 10, and given the poor mechanical strength of permanent magnets.

Figure 6:
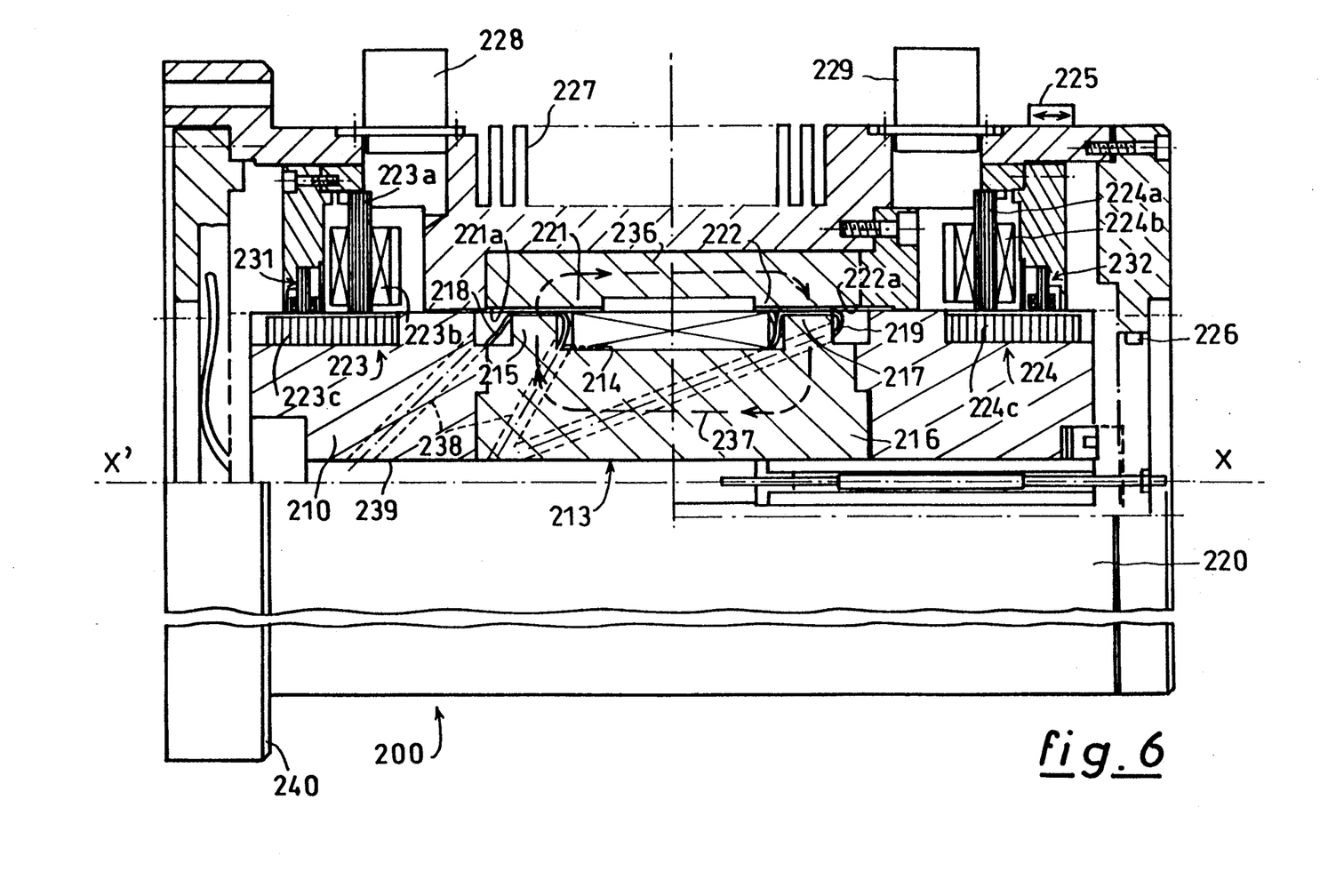
FIG. 6 is an axial half-section through a second embodiment of a vibrator device implementing an electromagnet.
Figure 7:
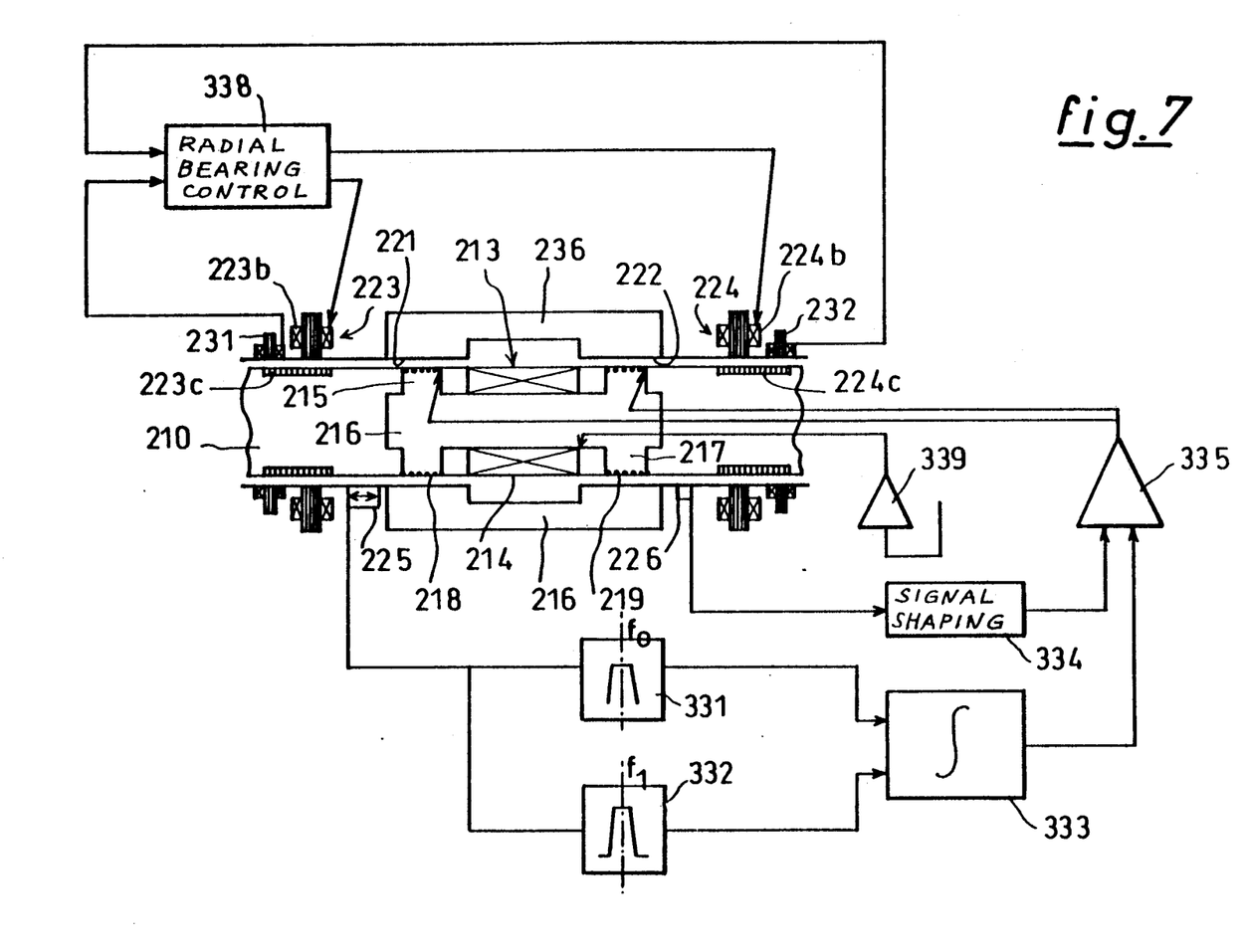
FIG. 7 is a block diagram showing the servo-control circuits associated with the FIG. 6 vibrator device.

The embodiment shown in FIGS. 6 and 7 remedies this drawback insofar as the magnetic field for the linear motor of the second embodiment of a vibrator 200 is created by means of an electromagnet 213 instead of by means of a permanent magnet.

The vibrator 200 of FIGS. 6 and 7 is fairly similar in structure to the vibrator 100 of FIGS. 1 to 5 insofar as it likewise comprises two coaxial structures 210 and 220 about an axis X'X and held relative to each other without contact by means of two radial active magnetic bearings 223 and 224, with one of the structures 220 of the vibrator being fixed to a frame to be stabilized or vibrated along the axis X'X and with the other structure 210 of the vibrator being flexibly-mounted relative to the structure 220, there being a linear motor which causes the flexibly-mounted structure 210 to move axially relative to the structure 220 which is fixed to the frame.

Unlike the embodiment shown in FIGS. 1 to 5, the vibrator 200 in FIGS. 6 and 7 has a flexibly-mounted structure 210 disposed inside a stationary structure 220. As a result, there is no need to provide an outer protective casing around the vibrator assembly 200 since its outer structure 220 itself constitutes a protective casing.

Given that the stationary structure 220 constitutes the outer structure of the vibrator 200, the radial magnetic bearings 223 and 224 comprise laminated stator yokes 223a, 224a and electromagnet coils 223b, 224b mounted on the structure 220 around the central flexibly-mounted structure 210, and laminated rotor pole pieces 223c, 224c are themselves disposed at the periphery of the flexibly-mounted, circularly symmetrical central structure 210.

Detectors 231 and 232 for detecting the radial position of the inner structure 210 relative to the stationary outer structure 220 are disposed in the vicinity of the radial bearings 223 and 224. References 228 and 229 in FIG. 6 designate connectors interconnecting the servo-control circuits 338 (FIG. 7) for the radial magnetic bearings 223 and 224 both with the radial detectors 231 and 232 and with the windings 223b and 224b of the radial bearings 223 and 224.

The central portion of the stationary outer structure 220 between the radial bearings 223 and 224 comprises a circularly symmetrical ferromagnetic portion 236 having cylindrical pole pieces 221 and 222 at respective ones of its two ends and performing the same functions as the pole pieces 21 and 22 of the vibrator 100 shown in FIGS. 1 to 5. These pole pieces have cylindrical inner peripheral portions 221a and 222a situated facing cylindrical pole pieces 215 and 217 fixed to the central structure 210 and provided with coils 218 and 219 disposed in the cylindrical annular air gaps between the pairs of pole pieces 215 and 221 and 217 and 222. The pole pieces 215 and 217 thus perform the same function as the pole pieces 15 and 17 of the vibrator 100 of FIGS. 1 to 5, and these pieces are shorter in the direction X'X than the facing pole pieces 221 and 222. The pole pieces 215 and 217 constitute a portion of a ferromagnetic circuit 216 constituted by the yoke of an electromagnet 213 having a coil 214. The magnetic flux established by the electromagnet 213 is represented in FIG. 6 by dashed lines 237, and it passes via the ferromagnetic circuits 216 and 236, through the pole pieces 215 and 221 and 217 and 222, and through the air gaps between the pole pieces.

The coils 218, 219, and 214 disposed in the flexibly-mounted inner structure 210 are powered via connection wires disposed in passages 238 opening out into an axial channel 239 formed in the inner structure 210 and itself opening out to the ends of the vibrator 200. A flow of cooling compressed air may be established through the passages 239 and 238 to remove the heat dissipated in the coils 218, 219, and 214. Joule effect losses in the exciting coil 214 thus do not constitute a drawback so long as the heat is removed either by the configuration of the structures 210 and 220, or else by air flows. FIG. 6 shows cooling fins 227 formed on the middle portion of the outer structure 220 in its region surrounding the various coils 218, 214, and 219.

As for the vibrator 100, one or more vibration detectors 225 for detecting vibration in the direction X'X are disposed on the stationary structure 220 or on the frame to which the vibrator 220 is fixed by means of a fixing flange 240 formed on the outer structure 220. A detector 226 analogous to the detector 26 of FIGS. 2 and 3 also serves to detect the relative axial positions of the structures 210 and 220 and to guarantee that the pole pieces 215 and 217 of the flexibly-mounted inner structure 210 and their coils 218 and 219 are indeed positioned facing the corresponding pole pieces 221 and 222 of the stationary outer structure 220.

FIG. 7 is a diagram showing the servo-control circuits corresponding to the embodiment of FIG. 6. The circuits 331 to 335 which co-operate with items 225, 226, 218, and 219 are similar to corresponding ones of the circuits 31 to 35 in the servo-control circuits described with reference to FIG. 3 and which co-operate with corresponding items 25, 26, 18, and 19, and these circuits are not described again. In particular, the circuit 334 may be constituted by a PID (Proportional-Integral-Derivative) type circuit.

FIG. 7 also shows an amplifier 339 feeding the coil 214 of the excitation electromagnet 213, and circuits 338 for servo-controlling the feed current applied to the electromagnet windings 223b and 224b on the basis of the signals provided by the radial detectors 231 and 232.

By way of example, the air gaps between the pole pieces 215 and 221 and 217 and 222 and the dimensions of these pole pieces may be selected to have numerical values of the same order of magnitude as those mentioned above with reference to the embodiment of FIGS. 1 to 5, and the same applies to the mass of the inner floating structure 210.

The cylindrical pole pieces 215 and 217 are avantageously split along an axial half-plane like the cylindrical pole pieces 15, 17 (see FIG. 5).

The vibrator of the invention is also usable when the axis X'X is not horizontal, but is inclined relative to the horizontal or is vertical. Under such circumstances, the effect of the weight of the flexibly-mounted structure (structure 20 in the embodiment of FIGS. 1 to 5, structure 210 in the embodiment of FIGS. 6 and 7) is compensated by means of a low-stiffness spring acting on said flexibly-mounted structure.

We claim:

1. A low-frequency vibrator acting in a low-frequency vibration domain for fixing to and applying low-frequency vibrations on a frame in a predetermined direction X'X wherein the vibrator comprises:
   (a) a first structure comprising first and second cylindrical pole pieces which are cylindrical about an axis extending along said direction X'X and which are provided at their peripheries with respective first and second coils, and at least one means for creating a magnetic field, said means being disposed between said first and second cylindrical pole pieces to cause magnetic flux to be established therebetween;
   (b) a second structure essentially comprising a cylindrical ferromagnetic mass coaxial about said axis and having third and fourth cylindrical pole pieces whose peripheries are situated facing said first and second coils respectively, enabling said magnetic flux to be established through said ferromagnetic mass;
   (c) first and second radial active magnetic bearings disposed on both sides of an assembly constituted by said first and second pole pieces for holding the second structure radially relative to the first structure without making contact therewith;
   (d) at least one detector for detecting vibrations including said low frequency vibrations along said axis, and disposed on one of said first and second structures; and
   (e) servo-control circuits for controlling the current flowing through the coils as a function of signals delivered at least by said detector.

2. A vibrator according to claim 1, wherein the first structure is fixed to a frame while the second structure is flexibly mounted relative to the first structure.

3. A vibrator according to claim 1, wherein the first structure is flexibly mounted relative to the second structure which is itself fixed to a frame.

4. A vibrator according to claim 1, wherein the first structure is disposed coaxially inside the second structure.

5. A vibrator according to claim 1, wherein the vibration detector is mounted on a stationary structure fixed to the frame.

6. A vibrator according to claim 5, including a plurality of vibration detectors distributed over a stationary structure fixed to the frame.

7. A vibrator according to claim 1, wherein said means for creating a magnetic field comprise a permanent magnet connected to the first and second cylindrical pole pieces by magnetic flux concentrating circuits.

8. A vibrator according to claim 1, wherein said means for creating a magnetic field are constituted by at least one electromagnet comprising a coil and a yoke fixed to said first and second cylindrical pole pieces.

9. A vibrator according to claim 1, wherein said first and second cylindrical pole pieces are split along at least one axial half-plane.

10. A vibrator according to claim 1, wherein the circuits for servo-controlling the current flowing through the first and second coils include a four-quadrant type output amplifier.

11. A vibrator according to claim 1, wherein the circuits for servo-controlling the current flowing through the first and second coils include at least one bandpass filter to which the signals from the vibration detectors are applied.

12. A vibrator according to claim 1, further comprising a position detector for detecting the axial positions of the coils of the first structure relative to said corresponding third and fourth cylindrical pole pieces of the second structure, and an additional servo-control loop for controlling the current flowing through the coils as a function of the signals from said position detector.

13. A vibrator according to claim 1, wherein the axial length of said first and second cylindrical pole pieces lies between about 10 mm and about 30 mm, whereas the axial length of the third and fourth cylindrical pole pieces lies between about 30 mm and about 60 mm.

14. A vibrator according to claim 1, wherein the air gaps between the first and second cylindrical pole pieces and between the second and fourth cylindrical pole pieces are between about 1 mm and about 3 mm across.

15. A vibrator according to claim 1, including radial detectors associated with the first and second radial active magnetic bearings and disposed in the same radial planes as said radial active bearings.

16. A vibrator according to claim 1, wherein the circuits for servo-controlling the current flowing in the first and second coils are configured in such a manner that the vibrator operates as a vibration damper.

17. A vibrator according to claim 1, wherein the circuits for servo-controlling the current flowing in the first and second coils are configured in such a manner that the vibrator operates as a vibration exciter.

18. A vibrator according to claim 1, wherein that one of the first and second structures which is flexibly-mounted relative to the frame has a mass lying in the range about 50 kg to about 100 kg.

19. A vibrator according to claim 1, operating at a frequency lying in the range a few Hz to a few tens of Hz.

* * * * *